(12) United States Patent
Toth et al.

(10) Patent No.: US 12,420,767 B2
(45) Date of Patent: Sep. 23, 2025

(54) BRAKE CONTROL SYSTEM

(71) Applicant: Knorr-Bremse Systeme Fuer Nutzfahrzeuge GmbH, Munich (DE)

(72) Inventors: Zoltan Toth, Budapest (HU); Gabor Toth, Budaörs (HU); Oliver Udvardy, Budapest (HU); Richard Budafoki, Györ (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 236 days.

(21) Appl. No.: 18/041,567

(22) PCT Filed: Aug. 19, 2021

(86) PCT No.: PCT/EP2021/073053
§ 371 (c)(1),
(2) Date: Feb. 14, 2023

(87) PCT Pub. No.: WO2022/053282
PCT Pub. Date: Mar. 17, 2022

(65) Prior Publication Data
US 2023/0303050 A1   Sep. 28, 2023

(30) Foreign Application Priority Data

Sep. 8, 2020   (EP) .................................... 20194977

(51) Int. Cl.
*B60T 17/22*        (2006.01)
*B60T 8/88*         (2006.01)
(Continued)

(52) U.S. Cl.
CPC .............. *B60T 17/22* (2013.01); *B60T 8/885* (2013.01); *F16D 66/00* (2013.01); *B60T 13/66* (2013.01);
(Continued)

(58) Field of Classification Search
CPC ........ B60T 8/885; B60T 13/66; B60T 13/746; B60T 2210/20; B60T 2210/32;
(Continued)

(56) References Cited

U.S. PATENT DOCUMENTS 9,776,613 B2 * 10/2017 Chang ..................... B60T 8/171
11,926,296 B2 * 3/2024 Yokoyama .............. B60T 1/065
(Continued)

FOREIGN PATENT DOCUMENTS

KR    20100040147 A * 4/2010 ............ B60T 13/746

OTHER PUBLICATIONS

Moon, KR 2010-0040147, machine translation (Year: 2010).*
International Search Report for PCT/EP2021/073053, Issued Oct. 27, 2021.

*Primary Examiner* — Phutthiwat Wongwian
*Assistant Examiner* — Mark L. Greene
(74) *Attorney, Agent, or Firm* — NORTON ROSE FULBRIGHT US LLP

(57) ABSTRACT

A brake control system for issuing an early warning about a malfunction of a brake of a vehicle, in which the brake is configured to receive a brake signal and to perform a braking process after receiving the brake signal. The vehicle includes a sensor to generate sensor data, indicative of an actuation force of the brake. The brake control system includes a reception module to receive the brake signal and the sensor data, and by a processing module to monitor the sensor data during subsequent stages of the braking process, to detect, based on the monitored sensor data, a potential malfunction of the brake, and to issue a warning signal if the potential malfunction is detected.

17 Claims, 6 Drawing Sheets

(51) Int. Cl.
*F16D 66/00* (2006.01)
*B60T 13/66* (2006.01)
*B60T 13/74* (2006.01)

(52) U.S. Cl.
CPC ......... *B60T 13/746* (2013.01); *B60T 2210/20* (2013.01); *B60T 2210/32* (2013.01); *B60T 2240/00* (2013.01); *B60T 2270/406* (2013.01); *B60T 2270/413* (2013.01); *B60T 2270/88* (2013.01); *F16D 2066/005* (2013.01)

(58) Field of Classification Search
CPC ........... B60T 2240/00; B60T 2270/406; B60T 2270/413; B60T 2270/88; F16D 66/00; F16D 2066/005
See application file for complete search history.

(56) References Cited

U.S. PATENT DOCUMENTS

| | | | |
|---|---|---|---|
| 11,938,937 B2 * | 3/2024 | Gaughan | B60W 30/16 |
| 2005/0029864 A1 | 2/2005 | Bauer et al. | |
| 2011/0073423 A1 | 3/2011 | Moon | |
| 2017/0197606 A1 | 7/2017 | Kipp | |

* cited by examiner

BRAKE CONTROL SYSTEM

FIELD OF THE INVENTION

The present invention relates to a brake control system and a method for issuing an early warning about a malfunction of a brake of a vehicle, and in particular to an optimized driver notification time for braking.

BACKGROUND INFORMATION

In many vehicles, in particular in commercial vehicles, a driver bears responsibility to make sure that a braking process has been performed successfully. This holds in particular for a parking brake application, where the driver plans to leave the vehicle after parking the vehicle. The decision that the engagement of the parking brake has been successful is primarily based on the driver's perception of the standing vehicle. This perception is often supported by a red (P) lamp on a dashboard, although this lamp merely indicates a contact of the foundation brake parts rather than a sufficient braking force applied by the brake to the wheel. Further support may be provided by a position of the parking brake hand control unit or the hand brake lever, and sometimes by a pressure value measured in a pressure chamber of the parking brake, which may also be indicated on the dashboard.

In older systems, the braking is applied or initiated by the driver. In more recent systems, several additional parking assistance functions have been developed, such as e.g. various versions of a roll-back prevention by automatically applying a service brake, or automatic application of the parking brake based on signals indicating that the driver will leave the vehicle shortly.

Although the driver is required to check the successful parking before leaving the vehicle even in these conventional assisted cases, experience actually indicates that drivers get used to the automatic functions and tend to leave the vehicle as soon as possible, sometimes within time spans on the order of a second. However, if the parking brake has not been applied successfully, and the driver has not checked this and/or has not taken any further countermeasure, an unintended roll-away of the vehicle might occur, which may have consequences for safety and integrity of the vehicle.

SUMMARY OF THE INVENTION

At least some of the problems of the conventional device as described above are overcome by a brake control system as described herein, a brake unit as described herein, a vehicle as described herein, a method as described herein, and a computer product as described herein. The further embodiments refer to further advantageous realizations of the subject matter of the main descriptions herein.

The present invention relates to a brake control system for issuing an early warning about a malfunction of a brake of a vehicle. The brake is configured to receive a brake signal, and to perform a braking process after receiving the brake signal. The vehicle comprises a sensor which is configured to generate sensor data indicative of an actuation force of the brake, i.e. of a force or pressure the brake applies on a wheel. The brake control system is characterized by a reception module, configured to receive the brake signal and the sensor data, and by a processing module, configured to monitor the sensor data during subsequent stages of the braking process, to detect, based on the monitored sensor data, a potential malfunction of the brake (or a failure or insufficiency of the braking process), and to issue a warning signal if the potential malfunction is detected. The early warning is, in particular, a warning indicative of the progress of the braking process, i.e. the braking process may not yet be completed. The early warning may indicate that a successful completion is not to be expected.

The brake may be part of a brake unit, i.e. of a stand-alone device comprising the brake along with an apparatus for its electronic and mechanic control. The brake signal may have followed a request for an application of the brake by a driver, but it may also be based on an automatic brake application request from a system as known in the state of the art. The braking process is configured to apply the brake in normal use. The sensor data may indicate the actuation force of the brake in an indirect way, as a function of the force or pressure actually applied on the wheel for braking it. In embodiments, the sensor may therefore measure a pressure in a pressure chamber of a brake cylinder, or a force acting on an internal component e.g. in a transmission mechanism of the brake or brake unit, which may e.g. only be proportional to the force applied on the wheel. In some cases, however, the sensor may also be a force sensor actually sensing the actuation force, i.e. the force or pressure applied by the brake to the wheel.

The reception module includes an arrangement/apparatus to tap the sensor data and the brake signal, and may be configured for a communication of further data with other parts of the brake unit (which comprises the brake together with electric and mechanic components for its control) or of vehicle. The reception module may in particular be embodied as an interface controlling all data flow from and to the processing module.

In a simple embodiment, the processing module is adapted to merely verify, after receiving the brake signal, that the sensor data indicates a reaction of the brake. Advantageously, the processing module is configured to estimate in advance if the braking process will succeed, i.e. if eventually the force intended to brake the wheel will, given the initial reaction of the brake as indicated by the sensor data, actually be applied to the wheel. To this end, the processing module takes into account the sensor data already at a correspondingly early stage of the braking process, i.e. within a time interval starting after the brake signal has been received, and ending well before the braking process has been completed.

The processing module may therefore be configured to compare the sensor data with benchmarks (or threshold values) at one or more specific times (e.g. after 1, 2, and/or 3 seconds) after receiving the brake signal, and issue the warning signal if one or more of these benchmark tests have failed. The processing unit may also be configured to monitor, from the sensor data, if the force of the brake has reached a predefined value, and issue the warning signal if this value is not reached by a predefined time. The processing module may further be configured to extrapolate sensor data from the early stage into the future in order to estimate a success of the braking process. In all cases the processing module may be configured to sample the sensor data at a high rate, (e.g. on the order of milliseconds, depending on the sensor). This is particularly advantageous to obtain enough data for the extrapolation of the sensor data.

The processing module may be configured to issue several warnings, depending on a stage of the braking process. The warning may in particular be incremental, i.e. warning signals may be changing according to a probability of the malfunction of the brake (or of a failure of the braking process), and/or subsequent warning signals may increase in intensity.

Embodiments comprise the reception module and the processing module as separate processing units, but also incorporated within an electronic control unit where the two modules are partly or fully integrated into each other. The modules may share functions with each other, or with other components of the brake unit and/or of the vehicle.

Advantageously, the proposed brake control system is applied to a parking brake rather than a service brake, i.e. in a case where the braking process is configured to keep the vehicle motionless when parked. The parking brake is configured to brake the vehicle and to hold it in standstill. Such parking brake functions may take considerably more time than a service brake to reach a degree of actuation where the braking process may be deemed successful. The early indication provided by the presented brake control system offers the advantage of a quick confirmation that the requested braking will actually work.

Optionally, the brake is a pneumatic brake in a brake unit comprising a brake cylinder with a pressure chamber, the sensor is a pressure sensor, and the sensor data indicates a pressure in the pressure chamber. Such pneumatic brakes are particularly common in commercial vehicles.

Optionally, however, the brake is an electro-mechanic rather than a pneumatic brake. Electro-mechanic brakes are characterized by an electric motor as a brake actuator. In this case the sensor may be a force sensor. The sensor data may again only correspond to the force on the wheel in an indirect sense, i.e. the measured quantity may be a function of the actual force exerted by the brake on the wheel, as e.g, a current consumption of an electric actuator, a strain or other force in one or more components of the brake system, or a measure of a movement of one or more components of the brake system. Again, the electro-mechanic brake may in particular be a brake in a commercial vehicle.

Optionally, the braking process is configured to keep the vehicle motionless when parked. In this case, the brake is embodied as a parking brake of the vehicle, as opposed to a service brake. The parking brake is configured to brake the vehicle and to hold it in standstill. Such parking brake functions may take considerably more time to reach a degree of actuation where the braking may be deemed successful. The early indication provided by the presented brake control system offers the advantage of a quick confirmation that the requested braking will actually work.

Optionally the processing module is configured to detect the potential malfunction of the brake based on regression, such as logistic regression, of the monitored sensor data. While other methods for extrapolating data to estimate the failure or success of the braking process may be employed, logistic regression can advantageously provide, from the sensor data, a probability value for the two mutually exclusive outcomes that the braking is successful, or that there is a malfunction of the brake. In particular, the logistic regression may be employed as a binary classifier, in order to predict the probability of a malfunction of the brake from sensor data at an early stage of the braking process.

Optionally the processing module is configured to detect the potential malfunction of the brake based on a comparison of a progression (i.e., a time evolution) of the sensor data with a characteristic. Here characteristic can mean any set of data which is adapted to a comparison with the sensor data. In particular, the characteristic may comprise discrete data like threshold or benchmark values at specific points in time or within specific time intervals, but it may also comprise one or more continuous lines or curves. In particular, the processing module may be configured to fit, as a characteristic, a particular set of functions comprising unspecified coefficients, to the sensor data. Advantageously this happens at an early stage of the braking process, and is employed in order to extrapolate the sensor data into the future, ahead of time.

Optionally, the processing module is configured to store or record the sensor data, and to update the characteristic based on the stored sensor data. The update can yield a more successful detection of the potential malfunction of the brake. The update can be based on past failures of the brake, i.e. on stored sensor data from situations where the braking process did not succeed, but also on past successes, i.e. on stored sensor data from situations where the braking process did succeed, according to some standard. Likewise, the update may also be based on stored sensor data from situations where the processing module issued a warning, and/or on situations where this was not the case. The update may further involve a correction of a method to fit the characteristic, e.g. it may involve an adaptation of fitting parameters. For the update, a self-learning algorithm may be employed and installed in the processing module.

Optionally, the reception module is configured to receive a signal indicating a successful completion of the braking process, and the processing module is configured to store the progression of the sensor data and to update the characteristic if the reception module has received the signal indicating the successful completion of the braking process.

Optionally, if the vehicle comprises a further sensor configured to generate further sensor data, the reception module is configured to receive the further sensor data, and the processing module is configured to detect the potential malfunction based on the further sensor data. In particular, the further sensor may be configured to generate the further sensor data from measuring a motion and/or movement of the brake, a wheel speed, and/or an environmental condition, as e.g. a temperature, or a road slope. Generically, wheel speed sensors are installed on the vehicle, and the brake control system may be configured to correlate the sensor data indicating the force of the brake on a wheel with the motion of the wheel. If a temperature in surroundings of the brake can be measured, the processing module may be configured to apply different characteristics, adapted to the temperature, in order to assess/detect the potential malfunction of the brake.

Optionally, the processing module is configured to issue a warning signal to a driver, to surroundings of the vehicle, and/or to a further component of the vehicle. The warning signal may be acoustic and/or optical. If the warning is addressed at the driver, it may in particular be combined with a further system indicating the application of the parking brake, e.g. by a particular flashing state of a standard brake light signal in a cabin of the vehicle, and/or on a dashboard. The further component of the vehicle may in particular be an emergency system of an autonomous vehicle. If the brake is a parking brake, the warning signal may be adapted to trigger an automatic application of a service brake, e.g. in order to make sure that the vehicle is kept in standstill at least for a while.

Optionally, the processing module is configured to induce, if the malfunction of the brake is detected, a further attempt to perform the braking process. In particular, if the braking process leads to the application of a parking brake of the vehicle, the processing module, together with issuing the warning about the malfunction of the brake, may be configured to send the brake signal to the brake again, in order to automatically activate the brake. The process of inducing a brake application may be repeated several times, e.g. until a successful braking process is detected. In the case where the sensor is a pressure sensor for measuring a pressure in a pressure chamber, the processing module may be configured to activate an outlet valve of the pressure chamber repeatedly, or continuously. Advantageously, the processing module is configured to repeatedly check the sensor data in order to detect if the first or one of the subsequent braking processes has been terminated successfully.

Embodiments further refer to a brake unit for braking a wheel of a vehicle. The brake unit comprises a brake, configured to receive a brake signal and to perform a braking process after receiving the brake signal. The brake unit further comprises a sensor configured to generate sensor data indicative of an actuation force of the brake. The brake unit is characterized by a brake control system as described above.

Optionally, the brake is a parking brake.

Embodiments also refer to a vehicle, characterized by a brake unit with a brake control system of the kind described above. It is understood that the sensor is a component of the vehicle, and may be located within the brake unit.

Embodiments also refer to a method for issuing an early warning about a malfunction of a brake of a vehicle. The brake is configured to perform a braking process. The vehicle comprises a sensor configured to generate sensor data indicative of an actuation force of the brake. The method comprises the following steps: monitoring the sensor data during subsequent stages of the braking process; detecting, based on the monitored sensor data, a potential malfunction of the brake; and issuing a warning signal if a potential malfunction is detected.

This method may also be implemented in software or a computer program product. Embodiments of the present invention can, in particular, be implemented by software or a software module in an electronic control unit. Therefore, embodiments relate also to a computer program having a program code for performing the method, when the computer program is executed on a processor.

Some advantageous embodiments of a brake control system as described above will be summarized in the following. The brake control system is adapted to provide feedback about a successful brake application already a very brief time after the brake application has been triggered or requested. The brake signal triggering the application of the brake may follow a conscious request of the driver, but may also depend on an automatic system, in particular for autonomous or assisted driving. The brake control system will give the feedback to the driver that the braking process might not be successful, or probably will not be successful, based on a direct or indirect measure of a force applied by the brake to a wheel as a function of time. Advantageously, the brake control system is adapted to characteristics of the brake at hand. Embodiments of the brake control system can achieve a feedback or issue a warning signal within e.g. one second after the reception of the brake signal. Therefore, the driver has a particularly high chance of receiving the feedback before leaving the vehicle.

While the presented brake control system is advantageously adapted to an electronic or pneumatic parking brake, it may also be employed for a service brake. The precise type of brake may strongly influence details of the embodiment of the brake control system. In embodiments configured for a parking brake comprising a pressure chamber, the warning signal may be issued based on a few predefined fixed measuring points on the pressure vs time diagram, e.g. if a predefined pressure is not reached after a certain time. These measuring points, including their number, will depend on the pneumatic features of the brake. They may be adapted to a brake with linear dependency of pressure on time, or to some other standard of decrease (e.g. monotonic, or power law) of the pressure.

The predefined thresholds, limits, or other parameters according to which the presented brake control system (or, respectively, the processing module) checks the braking process, can be changed and/or adapted during operation, e.g. by one or more self-learning functions. The brake control system may be configured to update, these thresholds, limits, or other parameters, based on previous parking characteristics, in order to over time provide a better and faster estimation.

The brake control system may in particular be configured to fit one or more predefined functions with predefined parameters (comprised but not limited to linear decrease, polynomial decrease, exponential decrease) to the sensor data. In this manner, the brake control system can be configured to predict if a stable parking pressure will be reached within a predefined time, and/or issue an early warning signal to the driver or to another vehicle component. The fitting parameters of the previous function fitting can also be adapted, based on the performance of the system in operation, e.g. by a self-learning process.

If the pressure as a function of time comprises more than one distinct characteristic area (such as e.g. a fast initial pressure drop followed by a less steep pressure decay), different functions can be applied to the different areas.

The processing module may be configured to perform a regression in order to predict a yes or no answer to the question if the warning signal should be issued.

In addition, the processing module may be configured to store sensor data, and to perform a comparison of present sensor data with stored sensor data. This may include previous successful braking processes, where a criterion for a successful braking process may be that a pressure dropped below a predefined limit after a predefined time. The comparison may also be performed with respect to stored data of previous non successful braking processes. Especially in this case, the comparison may also be enhanced by further circumstantial data. For example, for a pneumatic brake a non-successful braking process may be characterized by one or more of the following: the pressure starts to increase after a certain time, the pressure levels off before reaching a predefined parking pressure or pressure limit, and/or a follow-up brake application was necessary.

The brake control system may be configured to base the detection of the potential brake malfunction on other measurable features which can indicate a quality of the braking process. Such measurable features may in particular consist of sensor data from other sensors, allowing to detect e.g. a movement of brake pads, or a speed of the wheel.

The brake control system may further be configured to detect a potential brake malfunction of a service brake, in particular in a situation where the vehicle is held by the service brake over a prolonged period of time.

As mentioned above, the brake control system may also be employed in an autonomous vehicle. In this case the warning concept can include the notification of people around the vehicle to be prepared to a potential movement of the driverless vehicle. Here the safety gain provided by the earlier notification is that the people around the vehicle will have more time to prepare, react, or move away from the vehicle.

Some embodiments of the brake control system and of the method for issuing an early warning about a malfunction of the brake will be described in the following by way of examples only, and with respect to the accompanying figures.

DETAILED DESCRIPTION

Figure 1:
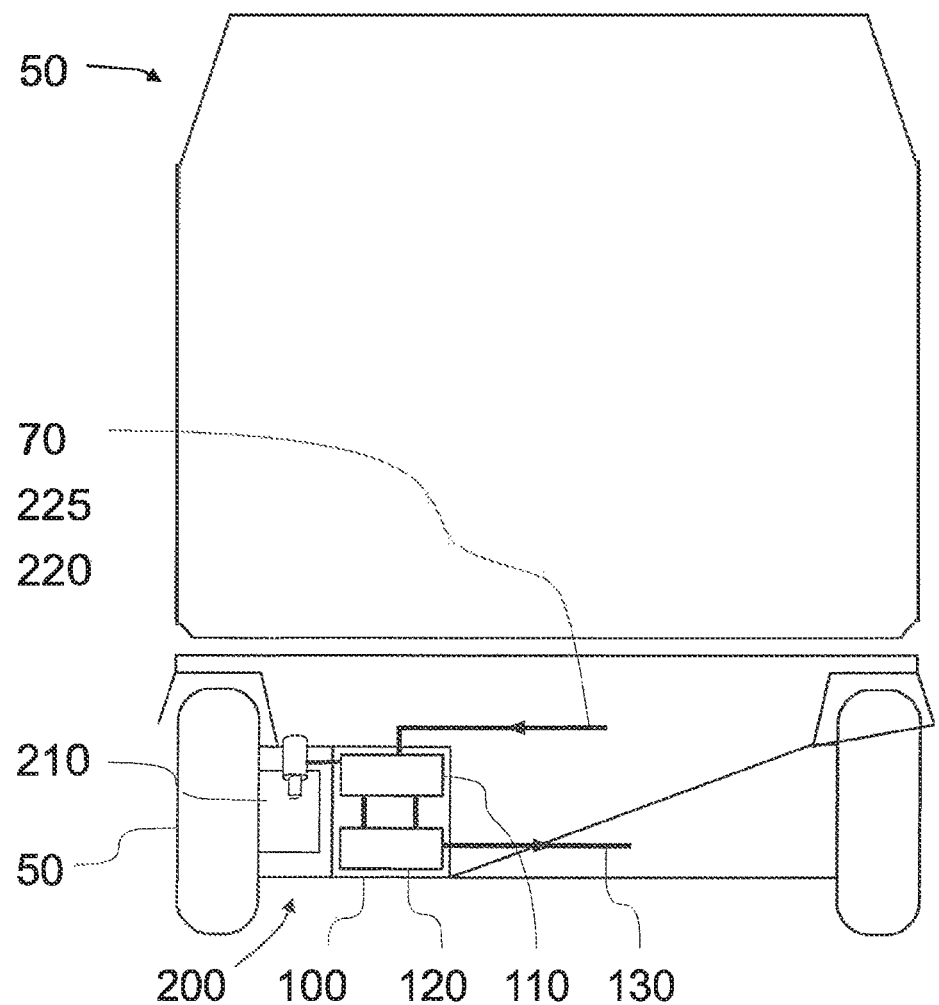
FIG. 1 schematically illustrates a brake control system according to the present invention.

FIG. 1 schematically illustrates an embodiment of a brake control system 100 for issuing an early warning 130 about a malfunction of a brake 210 of a vehicle 50 according to the present invention. Depicted is a cross section of a commercial vehicle 50, in particular intersecting a wheel 55 of the vehicle 50. In the present embodiment, the brake control system 100 is integrated in a brake unit 200 for the wheel 55. The brake unit 200 comprises the brake 210, which is configured to receive a brake signal 70, and to perform a braking process after receiving the brake signal 70. The vehicle 50 comprises a sensor 220 configured to generate sensor data 225 indicative of a force of the brake 210. The brake control system 100 comprises a reception module 110 and a processing module 120. The reception module 110 is configured to receive the brake signal 70 and the sensor data 225. The processing module 120 is configured to monitor the sensor data 225 during subsequent stages of the braking process, in particular during an early stage, and to detect, based on the monitored sensor data 225, a potential malfunction of the brake 210. The processing module 120 is further configured to issue the warning signal 130 to a driver or to another component of the vehicle 50, if the potential malfunction is detected. Advantageously, the brake 210 is a parking brake.

Figure 2:
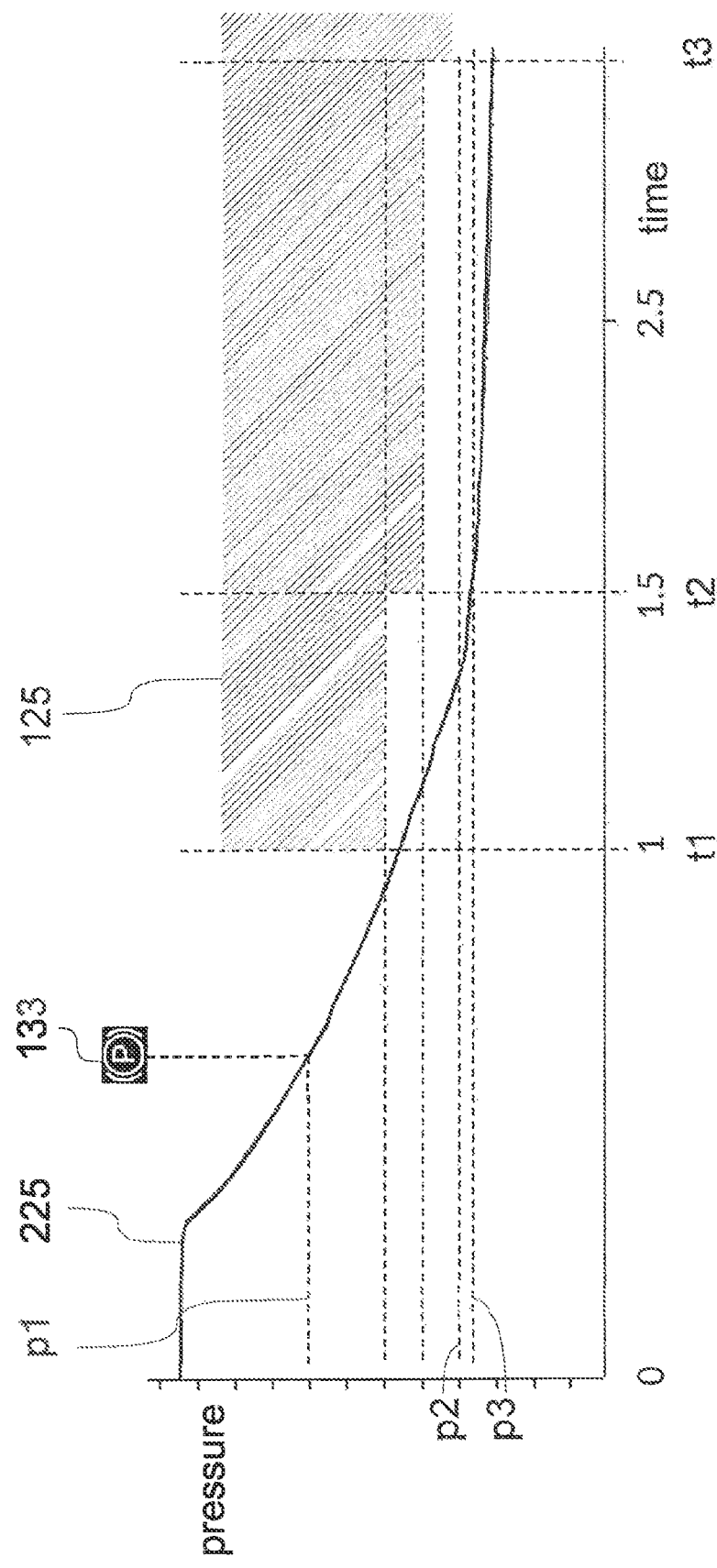
FIG. 2 depicts a first example of sensor data and reactions of an embodiment of the brake control system.

FIG. 2 depicts a first example of sensor data 225, together with reactions of an embodiment of the brake control system 100. In this embodiment, the brake 210 is a parking brake with a brake cylinder comprising a pressure chamber. The pressure chamber contains air under pressure, and reduces the pressure by releasing the air from the pressure chamber in order to apply a parking brake. In particular, the brake 210 may comprise a spring for exerting a force on the wheel 55, wherein the spring is held back from the wheel 55 by the pressure in the pressure chamber.

The figure shows a plot of sensor data 225 as measured by the pressure sensor 220 in the pressure chamber, as a function of time in arbitrary units. After receiving the signal 70, the pressure in the pressure chamber starts to decrease. Shortly after the decrease has set in, an information light 133 signals the initiation of the parking brake process to the driver. This may happen when the pressure reaches a threshold value p1. The processing module 120 is configured to check if at predefined measuring points (in time) t1, t2, t3, the pressure according to the sensor data 225 is below a threshold 125. A lower bound for the threshold 125 may be given by the pressure value p2, which is slightly above a pressure value p3, below which the braking process is considered to have safely succeeded.

Figure 3:
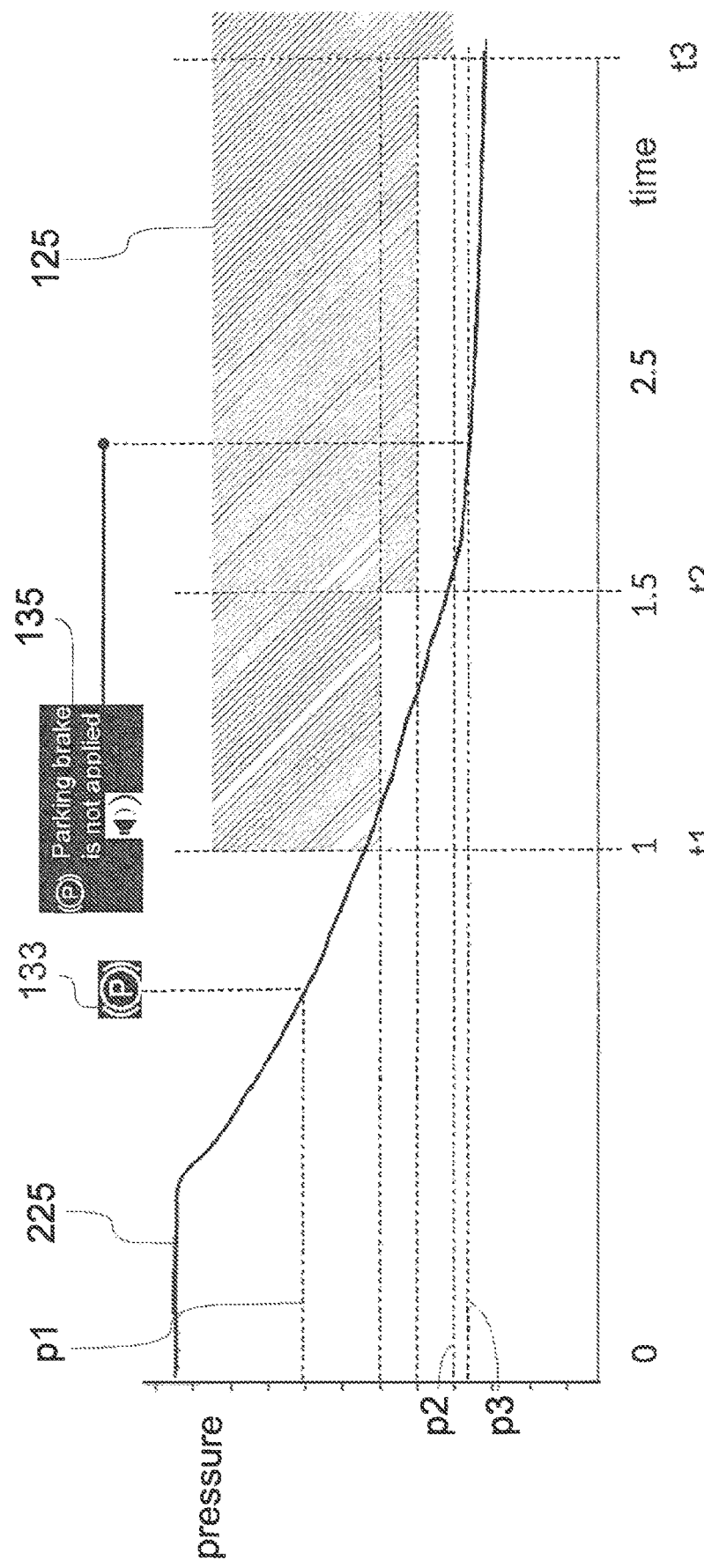
FIG. 3 depicts a second example of sensor data and reactions of an embodiment of the brake control system.

FIG. 3 depicts a second example of sensor data 225, together with reactions of an embodiment of the brake control system 100. The brake 210 may be of a form as described in FIG. 2.

The figure again shows a plot of sensor data 225 as measured by the pressure sensor 220 in the pressure chamber over time. After receiving the signal 70, the pressure in the pressure chamber starts to decrease. Shortly after the decrease has set in, an information light 133 signals the initiation of the parking brake process to the driver. The processing module 120 is configured to check if at the predefined measuring points t1, t2, t3, the pressure according to the sensor data 225 is below a threshold 125. This test fails at a first measuring point t1. In consequence, the processing module 120 issues a warning signal 130, e.g. in form of a dashboard message 135 together with an acoustic signal, to the driver. Even though the pressure is safely below the threshold 125 at a second measuring point t2, the warning signal 135 is active until the pressure drops below the value p3 at which the braking process is successful. This prompts a cancellation of the warning signal 135.

Figure 4:
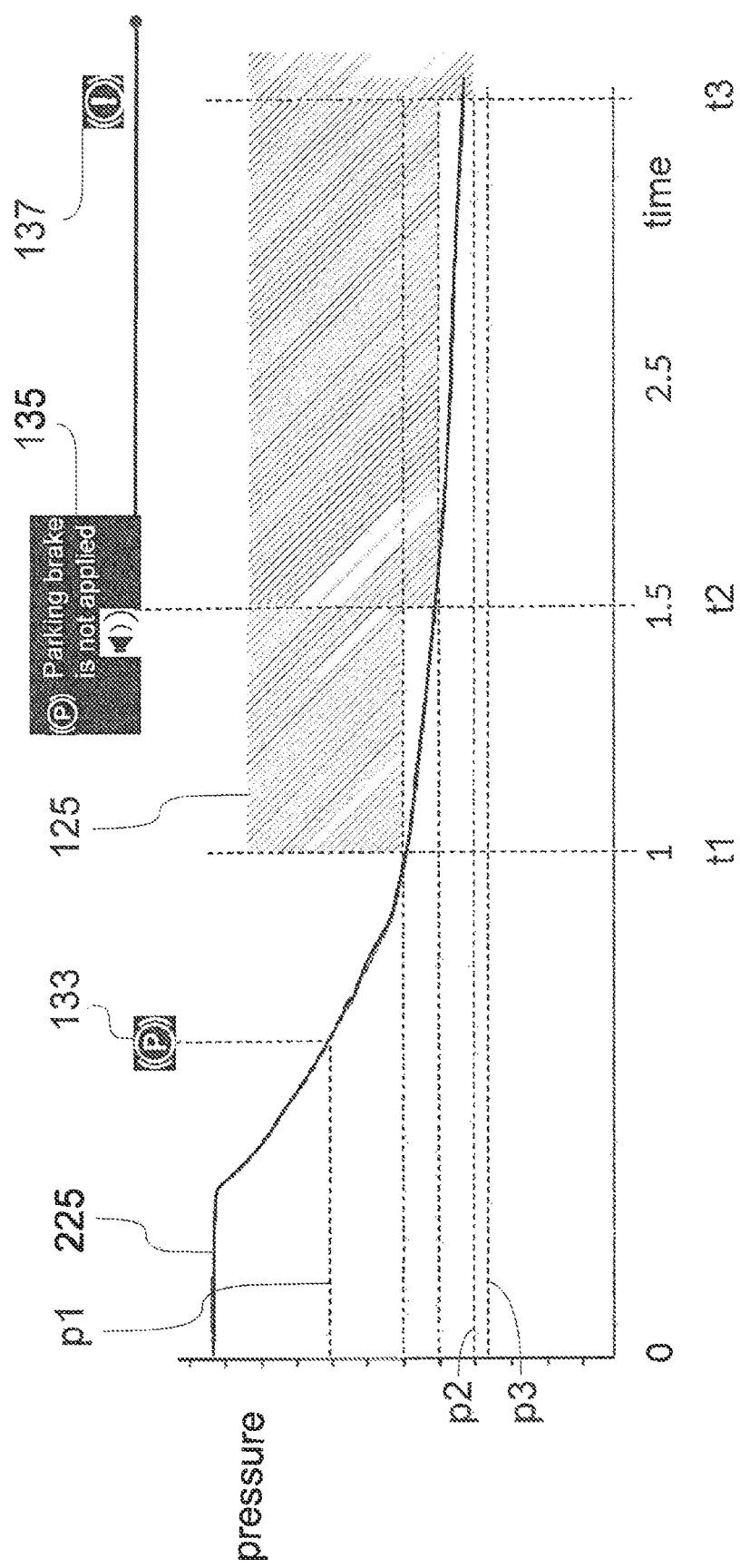
FIG. 4 depicts a third example of sensor data and reactions of an embodiment of the brake control system.

FIG. 4 depicts a third example of sensor data 225, together with reactions of an embodiment of the brake control system 100. The brake 210 may be of a form as described in FIG. 2.

As in FIG. 2 and FIG. 3, the present figure shows a plot of sensor data 225 as measured by the pressure sensor 220 in the pressure chamber, as a function of time (in arbitrary units). After receiving the brake signal 70, the pressure in the pressure chamber starts to decrease. Shortly after the decrease has set in, an information display light 133 signals the initiation of the parking brake process to the driver. The processing module 120 is configured to check at the predefined measuring points t1, t2, t3 if the pressure according to the sensor data 225 is below a threshold 125. In the present figure, this test is barely satisfied at the first measuring point t1, and fails at the second measuring point t2. In consequence, the processing module 120 issues a warning signal 130, e.g. in form of a dashboard message 135 together with an acoustic signal, to the driver. At the third measuring point t3, the pressure according to the sensor data 225 is still higher than the threshold 125, and in particular remains above the pressure value p3 which signals a safe success of the braking process. This may prompt a perpetuation of the dashboard message 135 and/or an additional warning signal to the driver. If the pressure continues to violate the threshold 125, a park timeout diagnostic trouble code (DTC) may be initiated, which may e.g. entail a declaration of failure of the brake 210 and/or an initiation of further attempts to activate the brake 210 or to ensure that the vehicle 50 remains in standstill.

Figure 5:
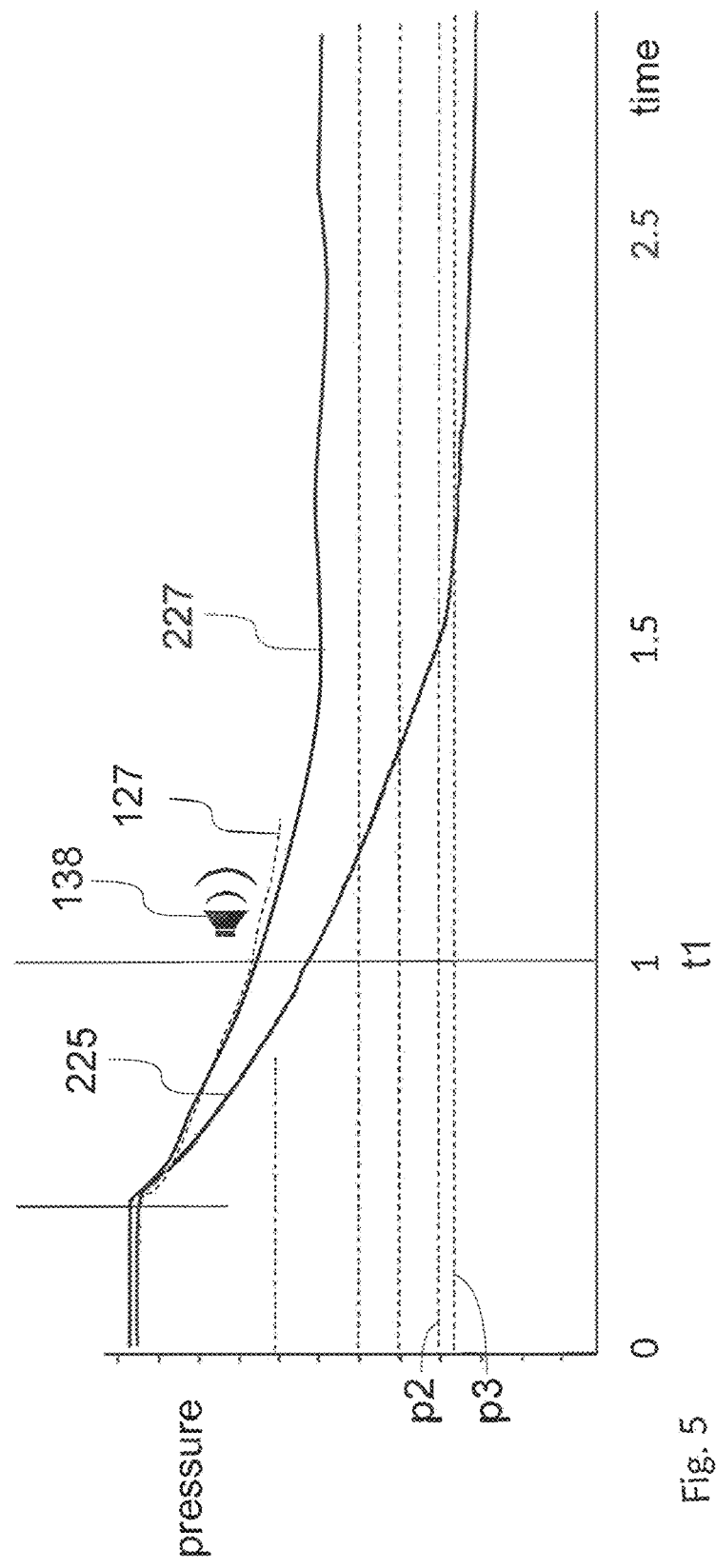
FIG. 5 depicts a fourth example of sensor data and reactions of an embodiment of the brake control system, in particular including an extrapolation.

FIG. 5 depicts two further examples of sensor data 225, 227, together with corresponding reactions of an embodiment of the brake control system 100. The brake 210 may be of a form as described in FIG. 2.

The present figure shows a plot of two cases of sensor data 225, 227 as measured by the pressure sensor 220 in the pressure chamber over time. In both a first sensor data set 225 and a second sensor data set 227, the pressure in the pressure chamber starts to decrease after the brake unit 200 has received the brake signal 70. In this embodiment, the processing module 120 is configured to fit a curve 127 to the sensor data (here only depicted for the second sensor data set 227), and to extrapolate the curve 127 to estimate a pressure value ahead of time. For this, the processing module is configured to sample the pressure data at a high rate, as e.g. 20 times within one unit of time as indicated in the figure, corresponding to a sampling rate on the order of a fraction of a second. If the extrapolation curve 127 at a particular future time (here t1, which may be e.g. 1 second after the brake receives the brake signal) yields a pressure estimate which lies above a threshold corresponding to that time t1, an acoustic warning signal 138 is issued. As in other embodiments, in such a case the processing module 120 may be configured to trigger further attempts at applying the brake. For example, the processing module 120 may be configured to first attempt a second and (if required) a third application of the brake 210. These attempts may be characterized, in comparison to a standard brake application following the brake signal 70, by an extended application of one or more outlet valves of the pressure chamber, with the aim of increasing a probability of completing the braking process successfully. If the third attempt fails to reduce the pressure sufficiently, the processing module 120 may be configured to initiate a diagnostic trouble code. This may involve a corresponding indication to the driver, and/or a continuous activation of the outlet valves for as long as the brake 210 receives power from a power supply.

The processing module may be configured to update, based on stored sensor data from past braking processes, parameters of the curve 127. This update may in particular take into account braking processes which terminated successfully. The update may further be based on further sensor data, e.g. pertaining to a temperature at the time of the braking process.

Figure 6:
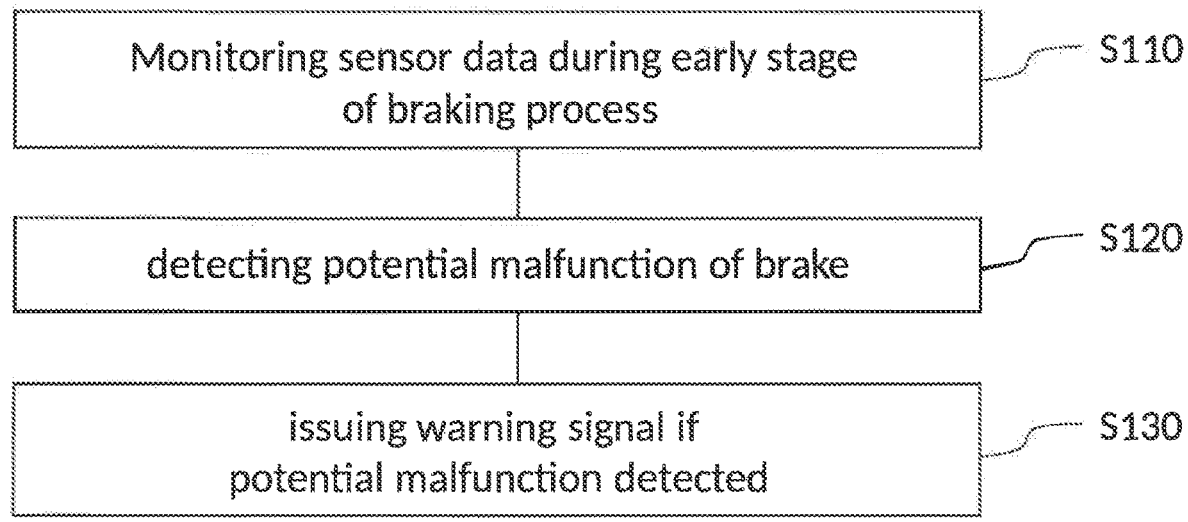
FIG. 6 shows steps of a method for issuing an early warning about a malfunction of a brake.

FIG. 6 shows steps of a method for issuing an early warning about a malfunction of a brake 210 of a vehicle 50. The brake 210 is configured to perform a braking process. The braking process may be triggered by a brake signal 70. The vehicle 50 comprises a sensor 220 configured to generate sensor data 225 indicative of an actuation force of the brake 210 on a wheel 55 of the vehicle 50.

A first step of the method comprises a monitoring S110 of the sensor data 225 during subsequent stages of the braking process. This may include a discrete sampling of the sensor data 225 at one or more points in time t1, t2, t3, but advantageously also at a high rate, after the braking process has been triggered or initiated. The monitoring of the sensor data in particular covers an early stage of the braking process.

A further step of the method comprises detecting S120, based on the monitored sensor data 225, a potential malfunction of the brake 210. The detection may involve a comparison of sample values of extrapolated values, or of a slope of the sensor data 225 with corresponding thresholds 125. It may also involve an estimation of future sensor data 225, e.g. by data fitting and/or by a regression method.

A further step comprises issuing S130 a warning signal 130, 133, 135, 138 if a potential malfunction is detected. The warning signal 130, 133, 135, 138 may e.g. be adapted to warn a driver of the vehicle 50, to inform people in a vicinity of the vehicle 50 of the potential brake malfunction, or to trigger an activation of another component of the vehicle 50.

This method may also be a computer-implemented method. A person of skill in the art will readily recognize that steps of the above-described method may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described method, when executed on the computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein, unless it is stated that a specific combination is not intended.

THE LIST OF REFERENCE SIGNS IS AS FOLLOWS

50 vehicle
55 wheel
70 brake signal
100 brake control system
110 reception module
120 processing module
125 threshold area
127 fitting curve
130 warning signal
133 information display/parking brake light
135 dashboard message
137 park timeout Diagnostic Trouble Code
138 acoustic warning
200 brake unit
210 brake
220 sensor
225 sensor data
227 sensor data of unsuccessful braking process
p1, p2, p3 pressure values
S110, S120, S130 steps of a method
t1, t2, t3 points in time

The invention claimed is:

1. A brake control system for issuing a warning about a malfunction of a brake of a vehicle, comprising:
   a reception module to receive a brake signal and sensor data, wherein the brake is configured to receive the brake signal and to perform a braking process after receiving the brake signal, and wherein the vehicle includes a sensor to generate the sensor data indicative of an actuation force of the brake; and
   a processing module to monitor the sensor data during subsequent stages of the braking process, to detect, based on the monitored sensor data, a potential malfunction of the brake, and to issue a warning signal when the potential malfunction is detected, wherein the reception module is an interface to control data flow from and to the processing module;
   wherein the processing module is configured to detect the potential malfunction of the brake based on a comparison of a progression of the sensor data with a characteristic, and
   wherein the processing module is configured to store the sensor data, and to update the characteristic based on the stored sensor data.

2. The brake control system of claim 1, wherein the brake includes a pneumatic brake with a brake cylinder having a pressure chamber, the sensor includes a pressure sensor, and the sensor data indicates a pressure in the pressure chamber.

3. The brake control system of claim 1, wherein the brake is an electro-mechanical brake, and the sensor is a force sensor.

4. The brake control system of claim 1, wherein the processing module is configured to detect the potential malfunction of the brake based on logistic regression of the monitored sensor data.

5. The brake control system of claim 1, wherein the vehicle includes a further sensor configured to generate further sensor data from measuring a temperature,
and the processing module is configured to apply different characteristics, adapted to the temperature, to detect the potential malfunction of the brake.

6. The brake control system of claim 1, wherein the processing module is configured to issue the warning signal to at least one of:
a driver,
surroundings of the vehicle, and/or
a further component of the vehicle.

7. The brake control system of claim 1, wherein the processing module is configured to induce, when the potential malfunction is detected, a further attempt to perform the braking process.

8. The brake control system according to claim 1, wherein:
the processing module is configured to detect, based on the monitored sensor data, the potential malfunction of the brake when the braking process is not yet complete,
the processing module is configured to issue the warning signal when the potential malfunction is detected to indicate that a successful completion of the braking system is not to be expected, and
the processing module is configured to induce, when the potential malfunction is detected, a further attempt to perform the braking process.

9. A brake unit for braking a wheel of a vehicle, comprising:
a brake to receive a brake signal and to perform a braking process after receiving the brake signal;
a sensor to generate sensor data indicative of an actuation force of the brake; and
a brake control system for issuing a warning about a malfunction of the brake of the vehicle, including:
a reception module to receive the brake signal and the sensor data, wherein the brake is configured to receive the brake signal and to perform a braking process after receiving the brake signal; and
a processing module to monitor the sensor data during subsequent stages of the braking process, to detect, based on the monitored sensor data, a potential malfunction of the brake, and to issue a warning signal when the potential malfunction is detected,
wherein the reception module is an interface to control data flow from and to the processing module;
wherein the processing module is configured to detect the potential malfunction of the brake based on a comparison of a progression of the sensor data with a characteristic, and
wherein the processing module is configured to store the sensor data, and to update the characteristic based on the stored sensor data.

10. The brake unit of claim 9, wherein the brake includes a parking brake.

11. The brake unit according to claim 9, wherein:
the processing module is configured to detect, based on the monitored sensor data, the potential malfunction of the brake when the braking process is not yet complete,
the processing module is configured to issue the warning signal when the potential malfunction is detected to indicate that a successful completion of the braking system is not to be expected, and
the processing module is configured to induce, when the potential malfunction is detected, a further attempt to perform the braking process.

12. A vehicle, comprising:
a brake unit for braking a wheel of a vehicle, including:
a brake to receive a brake signal and to perform a braking process after receiving the brake signal;
a sensor to generate sensor data indicative of an actuation force of the brake; and
a brake control system for issuing a warning about a malfunction of the brake of the vehicle, including:
a reception module to receive the brake signal and the sensor data,
wherein the brake is configured to receive the brake signal and to perform a braking process after receiving the brake signal; and
a processing module to monitor the sensor data during subsequent stages of the braking process, to detect, based on the monitored sensor data, a potential malfunction of the brake, and to issue a warning signal when the potential malfunction is detected, wherein the reception module is an interface to control data flow from and to the processing module;
wherein the processing module is configured to detect the potential malfunction of the brake based on a comparison of a progression of the sensor data with a characteristic, and
wherein the processing module is configured to store the sensor data, and to update the characteristic based on the stored sensor data.

13. The vehicle according to claim 12, wherein:
the processing module is configured to detect, based on the monitored sensor data, the potential malfunction of the brake when the braking process is not yet complete,
the processing module is configured to issue the warning signal when the potential malfunction is detected to indicate that a successful completion of the braking system is not to be expected, and
the processing module is configured to induce, when the potential malfunction is detected, a further attempt to perform the braking process.

14. A method for issuing an early warning about a malfunction of a brake of a vehicle, the method comprising:
monitoring sensor data during subsequent stages of a braking process, wherein the brake is configured to perform a braking process, and wherein the vehicle includes a sensor to generate the sensor data indicative of an actuation force of the brake;
detecting, based on the monitored sensor data, a potential malfunction of the brake; and
issuing a warning signal when the potential malfunction is detected;
wherein the detecting of the potential malfunction of the brake is based on a comparison of a progression of the sensor data with a characteristic, and
wherein the method further includes storing the sensor data, and updating the characteristic based on the stored sensor data.

15. The method according to claim 14, wherein:
the detecting, based on the monitored sensor data, of the potential malfunction of the brake is performed when the braking process is not yet complete,
the warning signal indicates that a successful completion of the braking process is not to be expected, and
the method further comprises:
inducing, when the braking process malfunction is detected, a further attempt to perform the braking process.

16. A non-transitory computer readable medium having a computer program, which is executable by a processor, comprising:
a program code arrangement having program code for issuing a warning about a malfunction of a brake of a vehicle, the program code, when executed by the processor, causing the processor to perform the following steps:
monitoring sensor data during subsequent stages of a braking process, wherein the brake is configured to perform a braking process, and wherein the vehicle includes a sensor to generate the sensor data indicative of an actuation force of the brake;
detecting, based on the monitored sensor data, a potential malfunction of the brake; and
issuing a warning signal when the potential malfunction is detected;
wherein the detecting of the potential malfunction of the brake is based on a comparison of a progression of the sensor data with a characteristic, and
wherein the program code further causes the processor to perform storing the sensor data, and updating the characteristic based on the stored sensor data.

17. The non-transitory computer readable medium according to claim 16, wherein:
the detecting, based on the monitored sensor data, of the potential malfunction of the brake is performed when the braking process is not yet complete,
the warning signal indicates that a successful completion of the braking process is not to be expected, and
the program code further causes the processor to perform:
inducing, when the braking process malfunction is detected, a further attempt to perform the braking process.

\* \* \* \* \*